United States Patent [19]

Litzenberger et al.

[11] Patent Number: 5,470,444
[45] Date of Patent: Nov. 28, 1995

[54] PROCESS FOR PREPARING LOW IRON AMMONIUM ALUM

[75] Inventors: Ingo F. Litzenberger, Frankfurt am Main; Günter Roller, Bad Homburg; Dieter Stein, Wiesbaden, all of Germany

[73] Assignee: Metallgesellschaft Aktiengesellschaft, Frankfurt, Germany

[21] Appl. No.: 386,811

[22] Filed: Feb. 8, 1995

[30] Foreign Application Priority Data

Feb. 17, 1994 [DE] Germany .................. 44 04 952.8

[51] Int. Cl.[6] .................................................. C25B 1/00
[52] U.S. Cl. .................................................. 204/93

[58] Field of Search .................. 204/86, 92, 93, 204/130, 149, 151, 152, DIG. 13; 210/748

[56] References Cited

U.S. PATENT DOCUMENTS 3,969,207  7/1976  Kerti et al. ........................ 588/243

*Primary Examiner*—John Niebling
*Assistant Examiner*—Brendan Mee
*Attorney, Agent, or Firm*—Herbert Dubno

[57] ABSTRACT

An aqueous ammonium alum solution which contains $Fe^{3+}$ ions and has a pH not in excess of 5 is passed through at least one half of the $Fe^{3+}$ ions in the solution to $Fe^{2+}$ ions. The solution is cooled and ammonium alum is crystallized whereas the $Fe^{2+}$ ions remain in the liquid phase.

7 Claims, 1 Drawing Sheet

Fig.1
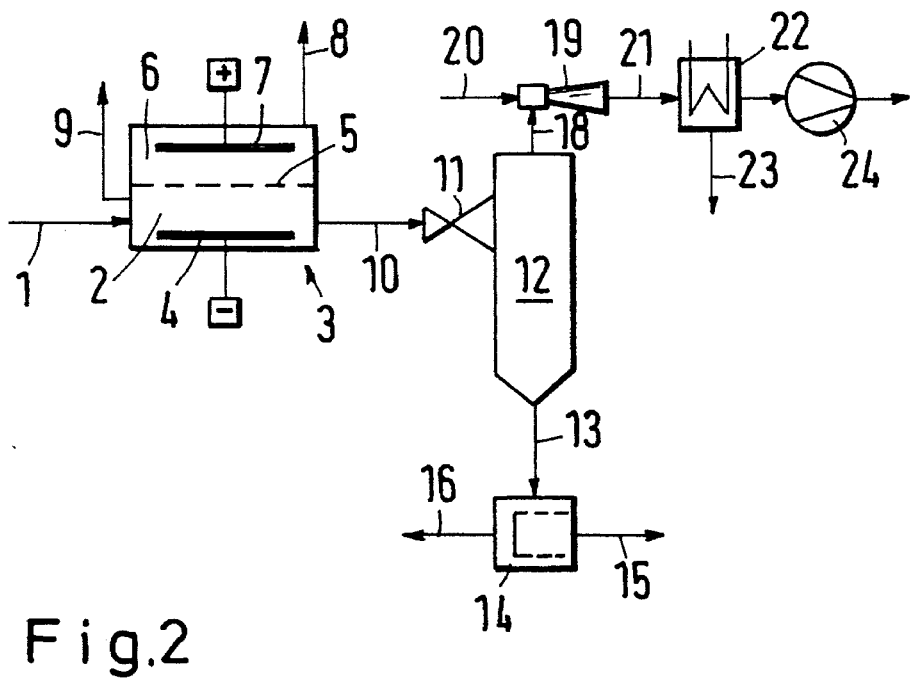
Fig.2
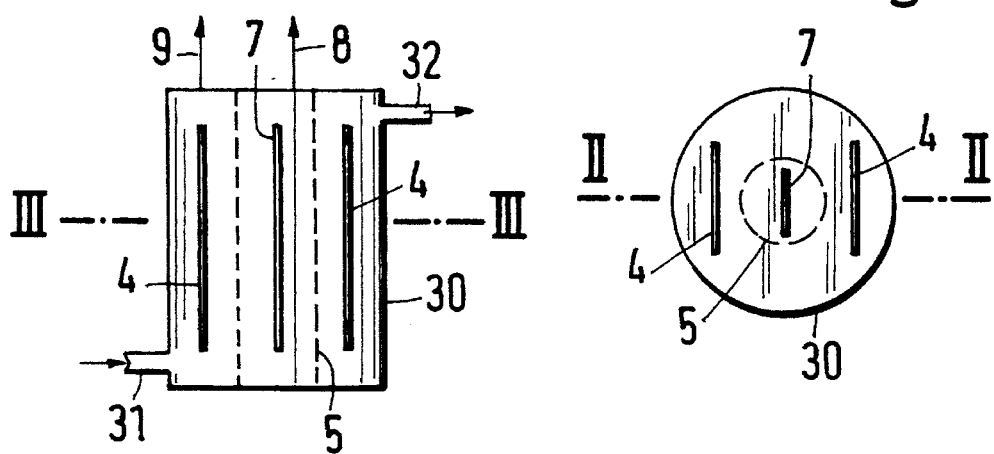
Fig.3
Fig.4
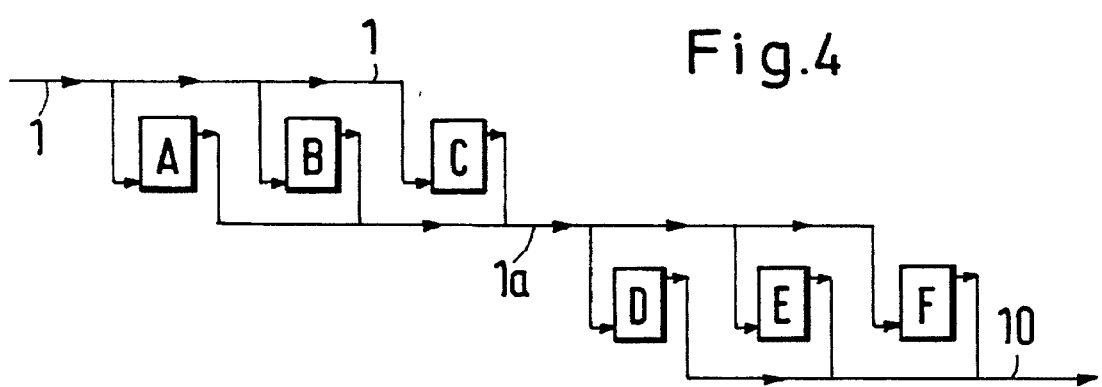

PROCESS FOR PREPARING LOW IRON AMMONIUM ALUM

FIELD OF THE INVENTION

The present invention relates to a process for preparing low iron ammonium alum from an aqueous ammonium alum solution containing $Fe^{3+}$ ions.

BACKGROUND OF THE INVENTION

In the treatment of sulfuric acid-containing waste waters formed, for example, in metallurgical processes, an aqueous ammonium alum solution is sometimes formed, which contains iron(III) ions. Chemically pure ammonium alum has the formula $NH_4Al(SO_4)_2$, and the compound sometimes includes 12 molecules of water of crystallization. When ammonium alum is crystallized from a solution which contains $Fe^{3+}$ ions, the trivalent iron because of its affinity to aluminum, is included in the crystalline structure in a relatively high concentration.

OBJECT OF THE INVENTION

It is the object of the invention to prepare ammonium alum which has a very low iron content from an aqueous ammonium alum solution which contains $Fe^{3+}$.

SUMMARY OF THE INVENTION

This object is obtained according to the presently disclosed process for preparing ammonium alum with reduced iron content from an aqueous ammonium alum solution which contains $Fe^{3+}$ ions, which comprises the steps of:

(a) passing the aqueous ammonium alum solution containing $Fe^{3+}$ and having a pH not in excess of 5 through at least one electrolytic cell containing an anode and a cathode, and an external power source to generate a current and conducting the current through the electrolytic cell to electrolytically reduce at least half the $Fe^{3+}$ ions to $Fe^{2+}$ ions;

(b) subjecting the aqueous ammonium alum solution electrolytically reduced during step (a) to cooling and crystallization to form a liquid phase suspension containing crystalline ammonium alum and containing $Fe^{2+}$ ions in the liquid phase; and (c) separating the liquid phase from the crystallized ammonium alum.

In accordance with the present invention, the aqueous ammonium alum solution containing $Fe^{3+}$ and having a pH not in excess of 5 is passed through an electrolytic cell, at least one-half of the $Fe^{3+}$ ions in the solution are reduced to $Fe^{2+}$ ions, the solution is cooled, ammonium alum is crystallized, and crystalline ammonium alum is separated from the liquid phase, which contains $Fe^{2+}$. In most cases at least 80% of the $Fe^{3+}$ will be reduced to $Fe^{2+}$ in the electrolytic cell.

The aqueous ammonium alum solution in the electrolytic cell is at a temperature in the range of 20° to 105° C. and in most cases in the range of 50° to 90° C. The electrolytic cell is preferably supplied with a solution having a pH that is not in excess of 3.5. By the electrolysis the trivalent iron ions are reduced as completely as possible to divalent iron ions. Contrary to the trivalent iron ion, the divalent iron ion does not co-crystallize with ammonium alum.

Preferably the ammonium alum product obtained according to the present invention has an iron content of not more than 25 ppm.

BRIEF DESCRIPTION OF THE DRAWINGS

The above and other objects, features, and advantages will become apparent from the following, reference being made to the following accompanying drawings in which FIG. 1 is a flow diagram showing one embodiment of the process;

FIG. 2 is a longitudinal sectional view taken on line II—II in FIG. 3 and which shows an electrolytic cell used in the process;

FIG. 3 is a transverse sectional view taken on line III—III of FIG. 2 and showing the same electrolytic cell as in FIG. 2;

FIG. 4 shows an assembly of a plurality of electrolytic cells.

DETAILED DESCRIPTION OF THE DRAWINGS

According to FIG. 1, the raw aqueous ammonium alum solution, which contains $Fe^{3+}$ ions, is supplied in line 1 and enters the cathode chamber 2 of an electrolytic cell 3. The cathode 4 may be made, e.g., of titanium. The cathode chamber 2 is separated from the anode chamber 6 by a liquid-permeable, porous partition 5. The anode 7 may also be made of titanium, for instance.

To effect a reduction to the highest possible degree, a current of greater amperage is usually conducted through the electrolytic cell 3 than is required to reduce the iron (III) ions to divalent ions. As a result, oxygen is formed at the anode and hydrogen is formed by a side reaction at the cathode 4. Lines 8, 9 for withdrawing the oxygen and hydrogen gases are connected to the anode chamber and to the cathode chamber, respectively.

An aqueous ammonium alum solution which has only a small residual content of $Fe^{3+}$ ions is withdrawn in line 10 from the electrolytic cell 3 and through a pressure-reducing valve 11 is supplied to a vacuum crystallizer 12. The solution is cooled and supersaturated by the pressure relief so that the suspension that is formed in the sump of the vessel 12 contains crystalline ammonium alum. The suspension is withdrawn in line 13 and is supplied to a centrifuge 14 so that the desired low-iron ammonium alum is obtained at the outlet 15. The liquor which has been separated and contains the $Fe^{2+}$ ions is withdrawn in line 16.

The vapor that has been flashed off in the vessel 12 is exhausted through the line 18, which is connected to a steam jet compressor 19, which is supplied with entraining steam through line 20. The mixed steam is then supplied through line 21 to a cooler 22, from which condensate is withdrawn in line 23. The remaining gases are exhausted by a fan 24.

The electrolytic cell which is schematically illustrated in FIGS. 2 and 3 comprises a housing 30 provided with an inlet 31 and an outlet 32, a cylindrical porous partition 5, a centrally disposed anode 7, and two cathodes 4. The housing 30 and the liquid-permeable partition 5 may be made, e.g., of polypropylene. Oxygen is withdrawn through the line 8 and hydrogen is conducted to the outside through the line 9.

For the processing of a solution at a high rate, a plurality of electrolytic cells may be connected as shown in FIG. 4. The solution supplied in line 1 is first distributed to a first group of three cells A, B and C, which are connected in parallel.

The solution streams drained from said cells still contain unreduced $Fe^{3+}$ ions. For this reason the streams are combined in a collecting manifold 1a, from which the solution is distributed to another group of electrolytic cells D, E and F, which are connected in parallel. The partial streams drained from the cells D, E and F have sufficiently low content of $Fe^{3+}$ ions and are combined in line 10 and are processed further as illustrated in FIG. 1. It will be understood that the number of cells which are connected in parallel in a group and the number of groups (one or more) may be varied as desired and may be adapted to the conditions in any given case.

EXAMPLE

A plant as shown in FIG. 1 is supplied through line 1 with an aqueous ammonium alum solution at a temperature of 75° C. and at a rate of 100,000 kg/h: The solution contains 26% by weight ammonium alum and has a pH of 2 and contains virtually all iron as $Fe^{3+}$ at a rate of 65 kg/h. The iron ions are electrochemically reduced as shown in FIGS. 2 to 4 in electrolytic cells. Three groups consisting each of 14 cells connected in parallel are formed. Each cell has titanium electrodes and its housing has a volume capacity of 40 liters. The cell voltage is 2 volts. An electric power of 120 kW is required for the reduction.

A pressure of 2.5 kPa (=25 mbars) prevails in the vacuum crystallizer 12; this corresponds to a water vapor equilibrium temperature of 21° C. In that case the solubility of ammonium alum in water is only 6.5% by weight.

The ammonium alum in line 15 has a residual iron content of only 25 ppm. If the electrochemical reduction were omitted, the ammonium alum in line 15 would contain 2500 ppm iron.

We claim:

1. A process for preparing ammonium alum with reduced iron content from an aqueous ammonium alum solution which contains $Fe^{3+}$ ions, which comprises the steps of:

(a) passing the aqueous ammonium alum solution containing $Fe^{3+}$ and having a pH not in excess of 5 through at least one electrolytic cell containing an anode and a cathode, and an external power source to generate a current and conducting the current through the electrolytic cell to electrolytically reduce at least half of the $Fe^{3+}$ ions to $Fe^{2+}$ ions;

(b) subjecting the aqueous ammonium alum solution electrolytically reduced during step (a) to cooling and crystallization to form a liquid phase suspension containing crystalline ammonium alum and containing $Fe^{2+}$ ions in the liquid phase; and (c) separating the liquid phase from the crystallized ammonium alum.

2. The process according to claim 1 wherein according to step (a) the aqueous ammonium alum solution which contains $Fe^{3+}$ has a pH not in excess of 3.5.

3. The process according to claim 1 wherein according to step (a) at least one electrolytic cell further comprises a cathode chamber in which the cathode is located, an anode chamber in which the anode is located, and a liquid permeable partition disposed between the cathode chamber and the anode chamber, and the aqueous ammonium alum solution which contains $Fe^{3+}$ ions is supplied to said cathode chamber.

4. The process according to claim 1 wherein at least 80 percent of the $Fe^{3+}$ ions contained in the aqueous ammonium alum solution are reduced to $Fe^{2+}$ ions in said electrolytic cell or cells.

5. The process according to claim 1 wherein according to step (a) the aqueous ammonium alum solution containing $Fe^{3+}$ ions is divided into at least two partial streams which are successively passed in parallel through at least one group of at least two of the electrolytic cells.

6. The process according to claim 1 for preparing ammonium alum substantially free from iron wherein the produced ammonium alum has an iron content of not more than 25 ppm.

7. The process according to claim 1 wherein according to step (a) the current conducted through the electrolytic cell or cells has a greater amperage than is stoichiometrically required to reduce all of the $Fe^{3+}$ to $Fe^{2+}$.

* * * * *